US012762933B2

(12) United States Patent
Agrawal et al.

(10) Patent No.: US 12,762,933 B2
(45) Date of Patent: Oct. 13, 2026

(54) ELECTRONIC SYSTEM WITH ALERTS TRIGGERED BY DETECTED AUDIO EXPOSURE FROM WEARABLE AUDIO OUTPUT DEVICE(S)

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 18/614,686

(22) Filed: Mar. 24, 2024

(65) Prior Publication Data

US 2025/0299542 A1 Sep. 25, 2025

(51) Int. Cl.
*G08B 5/22* (2006.01)
*G06F 3/16* (2006.01)

(52) U.S. Cl.
CPC ............ *G08B 5/226* (2013.01); *G06F 3/165* (2013.01)

(58) Field of Classification Search
CPC ................................ G08B 5/226; G06F 3/165
See application file for complete search history.

(56) References Cited

U.S. PATENT DOCUMENTS 10,296,954 B1 5/2019 Mishra
2008/0235853 A1 10/2008 Sousa
2014/0193001 A1 7/2014 Oishi
2018/0306637 A1* 10/2018 Goldstein ................ G01H 3/14
2019/0245635 A1 8/2019 Versakalo
2021/0174971 A1 6/2021 Jain et al.
2022/0109932 A1* 4/2022 Felton ...................... H04R 5/04
2022/0150617 A1 5/2022 Backe
2022/0217462 A1 7/2022 Panecki et al.
2023/0041455 A1* 2/2023 Liu ...................... H04R 1/1041
2023/0247340 A1 8/2023 Lee
2023/0254629 A1 8/2023 Ishibashi
2024/0098607 A1 3/2024 Srinivasan et al.
2024/0373181 A1 11/2024 Lundbäck
2025/0029632 A1* 1/2025 Park ........................ G10L 25/78

FOREIGN PATENT DOCUMENTS

CN 108270913 A * 7/2018 ........ H04M 1/72433
CN 110764730 A * 2/2020 ............... G06F 3/16

* cited by examiner

Primary Examiner — Rufus C Point
(74) *Attorney, Agent, or Firm* — Isidore PLLC

(57) ABSTRACT

An electronic device, method and computer program product monitor accumulated usage of connected audio wearable devices and employ digital wellbeing policies responsive the accumulated usage. The electronic device includes an audio driver configured to communicatively couple and transmit audio output to at least one wearable audio output device. A controller of the electronic device is communicatively coupled to the audio driver. The controller monitors presentation of audio output via each of the at least one wearable audio output device. The controller compares a total time of audio exposure to a user via each of the at least one wearable audio output device presenting the audio output with a corresponding audio exposure threshold within an exposure period of time. The controller presents an alert via an output device in response to the total time of audio exposure exceeding the audio exposure threshold.

18 Claims, 7 Drawing Sheets

ELECTRONIC SYSTEM WITH ALERTS TRIGGERED BY DETECTED AUDIO EXPOSURE FROM WEARABLE AUDIO OUTPUT DEVICE(S)

BACKGROUND

1. Technical Field

The present disclosure relates generally to electronic devices that presents audio output, and more particularly, to electronic devices that present the audio output via audio output devices in direct contact with ear(s) of a user.

2. Description of the Related Art

Over the past decade, wearable audio devices have witnessed an exponential surge in user adoption. From the introduction of Bluetooth earpieces to the widespread popularity of true wireless earphones and smart headphones, these audio devices have become integral to daily life of many portable electronic device users. The convenience, portability, and advancements in audio technology have fueled this trend. Users now often own multiple wearable audio devices, catering to various needs such as fitness, leisure, and work. These devices seamlessly integrate with an array of computing gadgets—smartphones, tablets, laptops, and smartwatches—creating a unified audio ecosystem. Bluetooth connectivity allows effortless pairing across devices, enabling users to switch between devices without interruptions. The rise of voice assistants like Siri, Alexa, and Google Assistant has further amplified the utility of these wearables, transforming the voice assistants into smart hubs for managing tasks, receiving notifications, and controlling other connected devices. As people increasingly embrace a multitasking lifestyle, the demand for wearable audio technology continues to soar, fostering innovation and enhancing the way users interact with their digital environments.

Continuous use of earphones carries substantial risks to hearing health. Prolonged exposure to high decibel audio levels can lead to potential hearing loss and various ear-related issues. In an example, moisture and limited ventilation caused by earphone use create an environment ripe for bacterial growth, elevating the risk of infections like otitis externa. This condition, characterized by inflammation and potential bacterial or fungal development, poses significant discomfort and health risks. Additionally, the constant pressure and friction from earphone buds can irritate the delicate ear canal, causing itching, discomfort, and even abrasions. While over-the-ear headphones distribute pressure differently, improper hygiene and extended use can still contribute to similar problems. Users, often enamored with the convenience, overlook the cumulative impact on their hearing.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
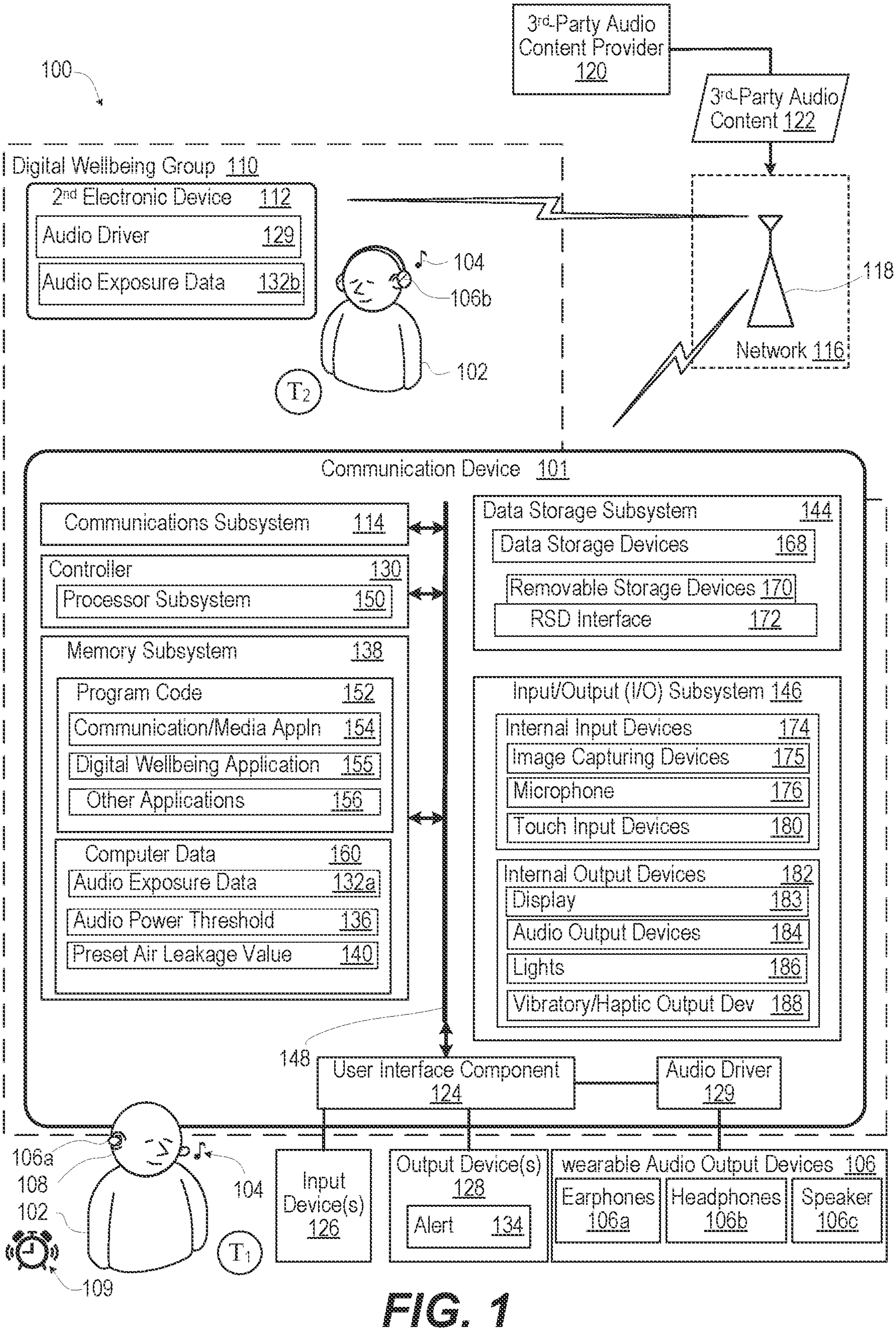
FIG. 1 presents a simplified functional block diagram a communication device that performs digital wellbeing management based on duration of using wearable audio output devices, according to one or more embodiments.

According to aspects of the present disclosure, an electronic system, a method, and a computer program product provide monitoring of accumulated usage of connected wearable audio output devices and employ digital wellbeing policies responsive to the accumulated usage. An electronic device includes an audio driver configured to communicatively couple and transmit audio output to at least one wearable audio output device (e.g., in-the-ear audio output devices such as earphones or over-the-ear audio output devices such as headphones). A controller of the electronic device is communicatively coupled to the audio driver. In one or more embodiments, the controller is also communicatively coupled to a visual output device, such as a display. The display may be integral to, or separate from, the electronic device. The controller monitors presentation of audio output via each of the at least one wearable audio output device. The controller compares a total time of audio exposure to a user via each of the at least one wearable audio output device presenting the audio output with a corresponding audio exposure threshold within an exposure period of time. The controller presents an alert via an output device (e.g., the at least one wearable audio output device or the display) in response to the total time of audio exposure exceeding the audio exposure threshold.

In one or more embodiments, the electronic device includes a communications subsystem by which the electronic device communicates with at least one second electronic device that also presents audio output via one or more of the at least one wearable audio output device. The controller may associate the electronic device and at least one second electronic device with a first user, the at least one second electronic device presenting second audio output via one or more of the at least one wearable audio output devices for listening by the first user. The controller may receive, via the communications subsystem from the at least one second electronic device, audio exposure data for audio exposure originating at the at least one second electronic device. The controller may determine the total time of the audio exposure to the user by aggregating audio exposure data originating at the electronic device and at the at least one second electronic device. In one or more particular embodiments, the controller may transmit, via the communications subsystem, audio exposure data originating at the electronic device to the at least one second electronic device to enable the at least one second electronic device to aggregate audio exposure originating at the electronic device and at the at least one second electronic device and to generate a subsequent alert in response to a second total time of audio exposure exceeding the audio exposure threshold.

Aspects of the present disclosure provide digital wellbeing management during use of wearable audio output devices that reduce or preclude air flow to ear canal(s) of a user who is listening to audio output. In one or more embodiments, the present disclosure may provide for determining usage of a short ranged wireless audio device for audio playback from more than one electronic device by the same user. The present disclosure may provide for associating each usage of audio playback via wearable audio device to the user using: (a) device sensors (e.g., camera, microphone) and device account information; (b) sensors on the wearable devices which helps determine device user; and (c) explicit confirmation by the user in the absence of user's identification. The present disclosure may provide for determining the type of the wearable audio device as one the following wearable categories: (a) wired/wireless; (b) open back/semi-open headphones; (c) bone conduction headphone/on ear headphones; (d) in-ear headphones/closed ear headphones. The present disclosure may provide for determining the usage of audio wearable device in an immersive mode (i.e., audio noise cancellation (ANC) or transparent mode). The present disclosure may provide for determining the audio volume level played during each playback. The present disclosure may provide for communicating between audio source devices and accumulating total listening time for each user across all the user's audio wearable devices. The present disclosure may provide for presenting periodic usage information to a user on a per audio source device basis as well as the wearable audio device basis along with audio volume level. The present disclosure may provide for presenting an alert warning to the user if the total playback time (e.g., for one wearable audio output device or for all wearable audio output device) is greater than a threshold in a given time period. The present disclosure may provide for offering to pause audio playback or offering playback to an alternative audio device that is better than the current one with regard to allowing more air flow to ear(s) of the user (e.g., over the ear headphones compared to in-ear).

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic system that includes or is wholly provided by an electronic device, in which the features of the present disclosure are advantageously implemented for monitoring presentation of audio output via wearable audio output device(s) directly to ear(s) of a user. Wellbeing policies are executed to present alerts, responsive to the accumulated usage. In one or more embodiments, the electronic device includes additional communications functionality as communication device 101 to operate as a mobile user device in communication environment 100. Communication device 101 can be one of a host of different types of devices, including but not limited to, a mobile cellular phone, satellite phone, or smart phone, a laptop, a netbook, an ultrabook, a networked smartwatch, or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices.

In an example, communication device 101 is operated by user 102 to listen to audio output 104 via at least one wearable audio output device 106. Wearable audio output device 106 is worn so as to direct audio output personally to one user. Wearable audio output devices 106 are generally worn on at least one ear of user 102 or worn on a head of user 102 and positioned proximate or overtop of at least one ear of user 102. User 102 may own wearable audio device 106 or merely have permission to use wearable audio device 106. In an example, one wearable audio output device is depicted at time "$T_1$" as an in-ear wearable audio output device(s), such as earphones 106*a* that has a low air leakage value. Earphones 106*a* substantially reduce or wholly preclude airflow to ear(s) 108 of user 102. Prolong audio exposure to earphones 106*a* may be undesirable due to effects of the audio sound itself and/or increased moisture levels within the ear encouraging bacterial growth. Another audio output device is depicted at time "$T_2$" as an over-the-ear wearable audio output device, such as headset 106*b* that has a moderate air leakage value. Headset 106*b* reduces airflow to ear(s) 108 of user 102. Sufficiently prolonged audio exposure to earphones 106*a* may be undesirable due to effects of the audio sound itself and/or increased moisture levels within the ear encouraging bacterial growth. Switching from earphone 106*a* to headset 106*b* may enable a longer period of time of usage without detrimental effect. However, the higher air leakage value of headset 106*b* may not be operatively appropriate in the presence of loud ambient noise 109.

Aspects of the present disclosure may be implemented across a digital wellbeing group 110 of devices, such as including communication device 101 and at least one second electronic device 112. Communication device 101 includes communications subsystem 114 that enables communication device 101 to connect or link over network 116, which includes node 118, to other devices within digital wellbeing group 110 (e.g., at least one second electronic device 112). Node 118 may represent a wireless access point, a cellular radio access network, a wired network interface, an over-the-air relay or repeater, or other communication link. Communication device 101 communicatively couples to at least one third-party audio content provider 120 via network 116 to receive third-party audio content 122. Communication device 101 includes at least one user interface component 124 configured to receive user inputs (e.g., touch, gesture, sound) via one or more input device 126 and to present outputs (e.g., light, sound, vibration) via one or more output devices 128. In addition to earphones 106*a* and headsets 106*b*, an example of output device 128 is an air-gapped audio output device such as audio speaker 106*c*. Speaker 106*c* provide an alternative way of presenting audio output (other than wearable audio output devices (106*a* and 106*b*) that does not limit airflow to ear(s) 108 (i.e., high air leakage value). Some locations may not be suitable for effective use of output device 128 for audio presentation due to presence of ambient noise 109 or proximity to other people.

In one or more embodiments, communication device 101 includes audio driver 129 configured to communicatively couple and transmit audio output to at least one audio output device 106. Controller 130 is communicatively coupled to audio driver 129 to monitor presentation of audio output 104 via each of the at least one wearable audio output device 106 to obtain audio exposure data 132*a* originating at communication device 101. Controller 130 compares a total time of audio exposure to user 102 via each of at least one wearable audio output device 106 presenting audio output 104 with a corresponding audio exposure threshold within an exposure period of time. Controller 130 presents alert 134 via output device(s) 128 in response to the total time of audio exposure exceeding the audio exposure threshold. In an example, alert 134 is presented by wearable audio output device 106 that is currently worn by user 102. Alternatively, or in addition, alert 134 is visually presented by output device 128 that is a display. Alert 134 may provide a prompt to pause audio output 104. Controller 130 pauses the presentation of audio output 104 on a current one of at least one wearable audio output device 106, in response to receiving a corresponding input via input device 126.

In one or more embodiments, communication device 101 communicates, via communications subsystem 114 with at least one second electronic device 112 that also presents audio output 104 via one or more of at least one wearable audio output device 106. Controller 130 associates communication device 101 and at least one second electronic device 112, as part of digital wellbeing group 1, with a first user (102). At least one second electronic device 112 present second audio output via one or more of at least one wearable audio output devices 106 for listening by the first user (102). Controller 130 receives, via communications subsystem 114 from at least one second electronic device 112, audio exposure data 132*b* originating at second electronic device 112. Controller 130 determines the total time of the audio exposure to user 102 by aggregating audio exposure data 132*a*-132*b* originating at communication device 101 and at least one second electronic device 112. In one or more particular embodiments, controller 130 transmits, via communications subsystem 114, audio exposure data 132*a* originating at communication device 101 to at least one second electronic device 112 to enable at least one second electronic device 112 to aggregate audio exposure data 132*a*-132*b* originating respectively at communication device 101 and at least one second electronic device 112 and to generate a subsequent alert in response to a second total time of audio exposure exceeding the audio exposure threshold.

In one or more embodiments, controller 130 monitors audio power level of audio output 104. Controller 130 compares the audio power level to audio power threshold 136 contained in memory subsystem 138 of communication device 101. Controller 130 aggregates the audio exposure total based at least in part on the audio power level being above audio power threshold 136. In one or more embodiments, controller 130 maintains subtotal values for audio exposure duration for each of at least two wearable audio output devices 106 (e.g., earphones 106*a* and headset 106*b*). Controller 130 identifies a respective air leakage value and audio exposure threshold for each wearable audio output device (106*a*-106*b*). Controller 130 compares each respective audio exposure threshold to the subtotal value from a corresponding wearable audio output device (106*a*-106*b*) during the exposure period of time. Controller 130 presents alert 134 via output device 128 to pause audio output 104 in response to the total time of audio exposure for any one of the at least two wearable audio output devices (106*a*-106*b*)

exceeding the respective audio exposure threshold for any one of the at least two wearable audio output devices (106*a*-106*b*).

In one or more embodiments, controller 130 maintains subtotal values for audio exposure duration for each of the at least two wearable audio output devices (106*a*-106*b*). Controller 130 identifies a respective air leakage value and audio exposure threshold for each wearable audio output device (106*a*-106*b*). Controller 130 compares the respective audio exposure threshold to the subtotal values during the exposure period of time. Controller 130 presents alert 134 via output device 128 to switch to another wearable audio output device 106 in response to the total time of audio exposure exceeding the respective audio exposure threshold for any one of two wearable audio output devices (106*a*-106*b*).

In one or more embodiments, communication device 101 includes memory subsystem 138 containing preset air leakage value 140 associated with a preset audio exposure threshold. In response to determining that two or more wearable audio output devices (106*a*-106*b*) having different air leakage values are used during the exposure period of time, controller 130 maintains subtotal values for audio exposure duration for each of wearable audio output devices (106*a*-106*b*). Controller 130 assigns a proportional weight to a respective duration of audio exposure for each of two or more wearable audio output devices (106*a*-106*b*) in relation to a ratio of the corresponding air leakage value to the preset air leakage value to normalize the respective durations. Controller 130 aggregates the weighted durations of audio exposure to a total audio exposure value. Controller 130 compares the total audio exposure value to the preset audio exposure threshold. Controller 130 presents alert 134 via output device 128 in response to the total time of audio exposure contributed by two or more wearable audio output devices (106*a*-106*b*) exceeding the preset audio exposure threshold.

Controller 130 includes processor subsystem 150, which includes one or more central processing units (CPUs) or data processors. Processor subsystem 150 can include one or more digital signal processors that can be integrated with data processor(s). Processor subsystem 150 can include other processors such as auxiliary processor(s) that may act as a low power consumption, always-on sensor hub for physical sensors. Controller 130 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

In an example, a first wearable audio output device has an audio exposure threshold of 90 minute and a first subtotal of usage of 60 minutes. A second wearable audio output device has an audio exposure threshold of 180 minutes and a second subtotal value of usage of 60 minutes. To aggregate the subtotals in one scenario, the second subtotal is normalized based on the threshold ratios being 1:2. The first second subtotal is weighted to 30 minutes and added to the first subtotal of 60 minutes for a total of 90 minutes to compare to the first exposure threshold of 90 minutes. The usage of the two wearable audio output devices meets the exposure threshold. Alternatively, the first subtotal of 60 minutes could be weighted to 120 minutes, added to the second subtotal of 60 minutes to total 180 minutes, which meets the second exposure threshold of 180 minutes.

In addition to communications subsystem 114, controller 130, and memory subsystem 138, communication device 101 may include data storage subsystem 144 and input/output (I/O) subsystem 146. To enable management by controller 130, system interlink 148 communicatively connects controller 130 with communications subsystem 114, memory subsystem 138, data storage subsystem 144 and I/O subsystem 146. System interlink 148 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 148) are illustrated in FIG. 1, it is to be understood that more, fewer, or different interconnections may be present in other embodiments.

Controller 130 may include various functionality that enables controller 130 to perform different aspects of artificial intelligence (AI) modules for computation tasks. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output.

Memory subsystem 138 stores program code 152 for execution by processor subsystem 150 to provide the functionality described herein. Program code 152 includes applications such as communication/media application 154 that provide audio output 104. Program code 152 may include digital wellbeing application 155 that tracks usage of wearable audio output devices 106 and include other applications 156. These applications/modules may be software or firmware that, when executed by controller 130, configures communication device 101 to provide functionality described herein.

In one or more embodiments, several of the described aspects of the present disclosure are provided via executable program code of applications executed by controller 130. In one or more embodiments, program code 152 may be integrated into a distinct chipset or hardware module as firmware that operates separately from executable program code. Portions of program code 152 may be incorporated into different hardware components that operate in a distributed or collaborative manner. Memory subsystem 138 further includes operating system (OS), firmware interface, such as basic input/output system (BIOS) or Uniform Extensible Firmware Interface (UEFI), and firmware, which also includes and may thus be considered as program code 152.

Program code 152 may access, use, generate, modify, store, or communicate computer data 160, such as audio power threshold 136 and preset air leakage value 140. Computer data 160 may incorporate "data" that originated as raw, real-world "analog" information that consists of basic facts and figures. Computer data 160 includes different forms of data, such as numerical data, images, coding, notes, and financial data. Computer data 160 may originate at communication device 101 or be retrieved from a remote device via communications subsystem 114. Communication device 101 may store, modify, present, or transmit computer data 160 such as audio exposure data 132*a*-132*b*. Computer data 160 may be organized in one of a number of different data structures. Common examples of computer data 160 include video, graphics, text, and images. Computer data 160 can also be in other forms of flat files, databases, and other data structures.

Data storage subsystem 144 of communication device 101 includes data storage device(s) 168. Controller 130 is communicatively connected, via system interlink 148, to data storage device(s) 168. Data storage subsystem 144 provides program code 152 and computer data 160 stored on non-volatile storage that is accessible by controller 130. For example, data storage subsystem 144 can provide a selection of program code 152 and computer data 160. These applications can be loaded into memory subsystem 138 for execution/processing by controller 130. In one or more embodiments, data storage device(s) 168 can include hard disk drives (HDDs), optical disk drives, and/or solid-state drives (SSDs), etc. Data storage subsystem 144 of communication device 101 can include removable storage device(s) (RSD(s)) 170, which is received in RSD interface 172. Controller 130 is communicatively connected to RSD 170, via system interlink 148 and RSD interface 172. In one or more embodiments, RSD 170 is a non-transitory computer program product or computer readable storage device that may be executed by a processor associated with a user device such as communication device 101. Controller 130 can access data storage device(s) 168 or RSD 170 to provision communication device 101 with program code 152 and computer data 160.

I/O subsystem 146 may include internal input devices 174 such as image capturing device(s) 175, microphone 176, and touch input devices 180 (e.g., screens, keys, or buttons). I/O subsystem 146 may include internal output devices 182 such as display 183, audio output devices 184, lights 186, and vibratory or haptic output devices 188.

In one or more embodiments, controller 130, via communications subsystem 114, performs multiple types of cellular over-the-air (OTA) or wireless communication, such as by using a Bluetooth connection or other wearable access network (PAN) connection. In an example, a user may wear a health monitoring device such as a smartwatch that is communicatively coupled via a wireless connection. In one or more embodiments, communications subsystem 114 includes a global positioning system (GPS) module that receives GPS broadcasts from GPS satellites to obtain geospatial location information. In one or more embodiments, controller 130, via communications subsystem 114, communicates via a wireless local area network (WLAN) link using one or more IEEE 802.11 WLAN protocols with an access point. In one or more embodiments, controller 130, via communications subsystem 114, may communicate via an OTA cellular connection with radio access networks (RANs). In an example, communication device 101, via communications subsystem 114, connects via RANs of a terrestrial network that is communicatively connected to a network server.

Figure 2:
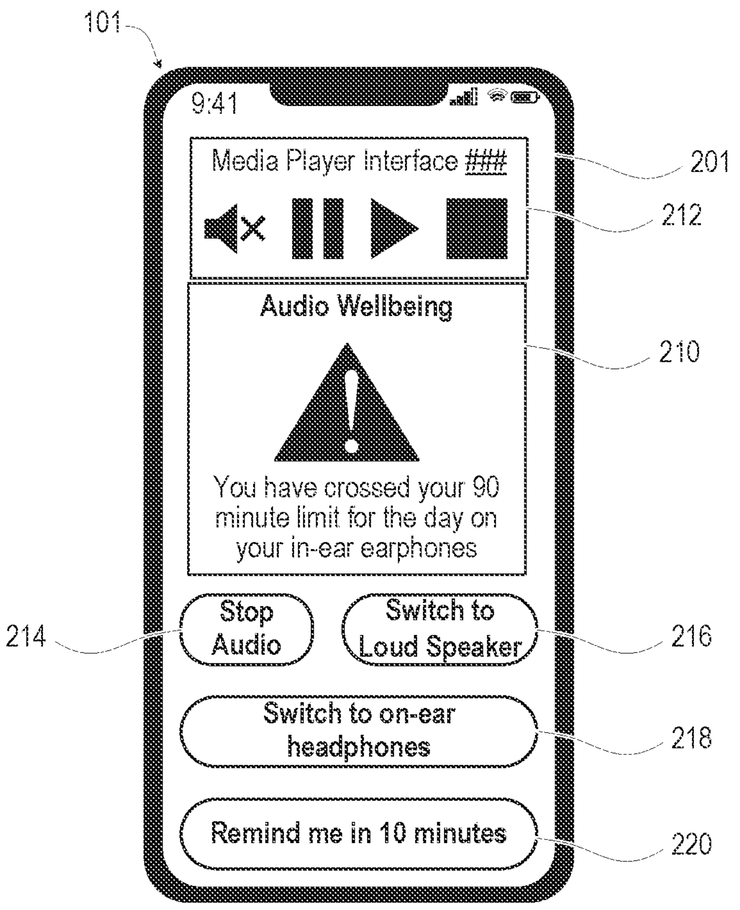
FIG. 2 is a front view of a touch display of the communication device presenting a notification of exceeding a duration threshold for using wearable audio output devices, according to one or more embodiments.

FIG. 2 is a front view of touch display 201 of communication device 101 presenting notification 210 for digital wellbeing management. In an example, audio output is in support of media playback application 212 generates audio for presenting by wearable audio output device (106*a*-106*b*). In an example, notification 210 is triggered by a duration threshold of 90 minutes for the day for in-ear earphones usage. In an example, notification 210 includes stop audio control 214 that prompts and triggers stopping audio output. In an example, notification 210 includes switch to loud speaker control 216 that prompts and triggers a switch to a loud speaker to avoid use of a wearable audio output device. In an example, notification 210 includes switch to on-ear headphone control 218 to prompt and trigger a switch to an on-ear headphone with increased air leakage. In an example, notification 210 includes remind me in 10 minutes control 220 to increase a duration threshold for generating notification 210.

Figure 3:
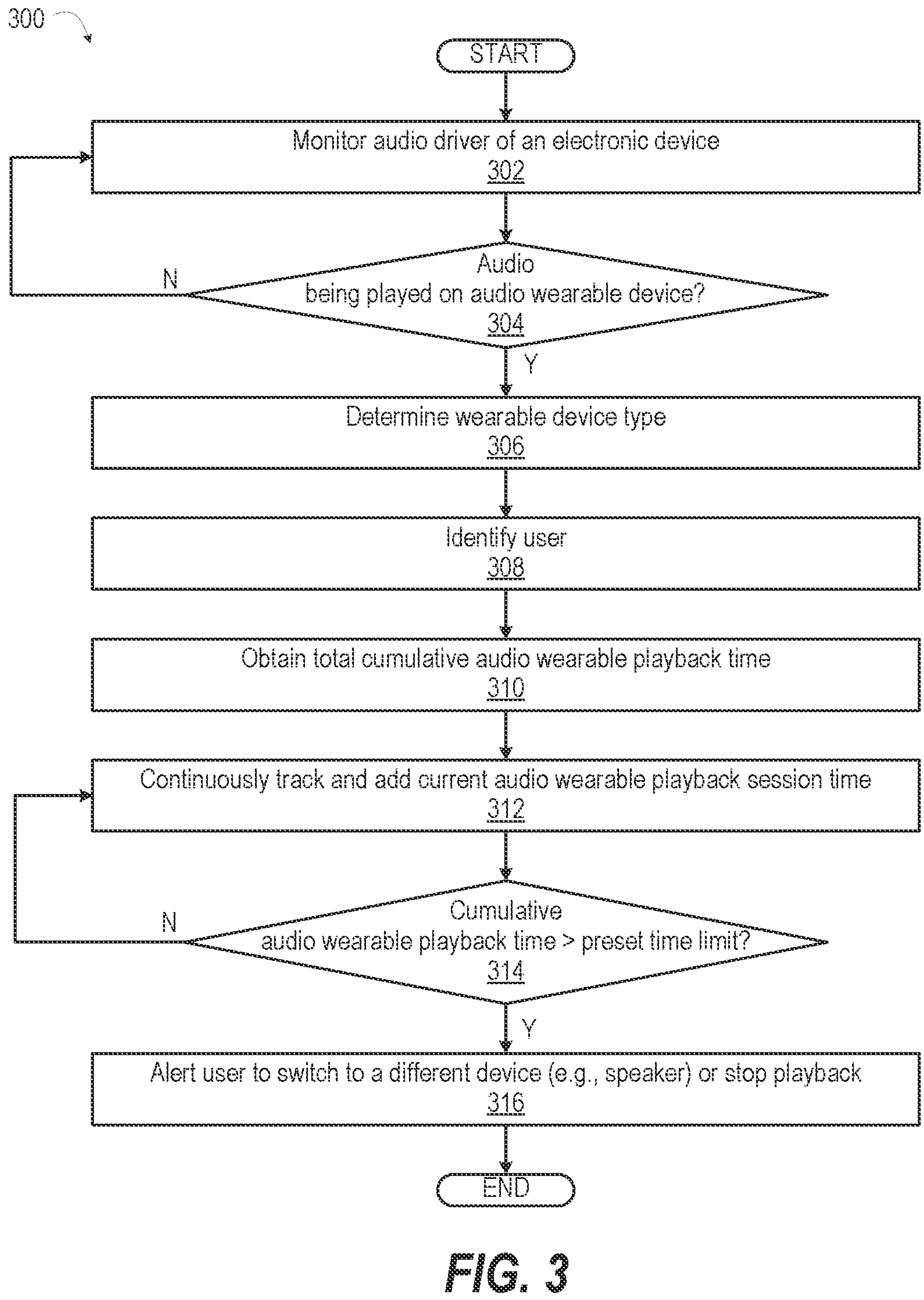
FIG. 3 is a flow diagram presenting an example method of digital wellbeing management based on context of use of connected short ranged wearable device(s), according to one or more embodiments.
Figure 4:
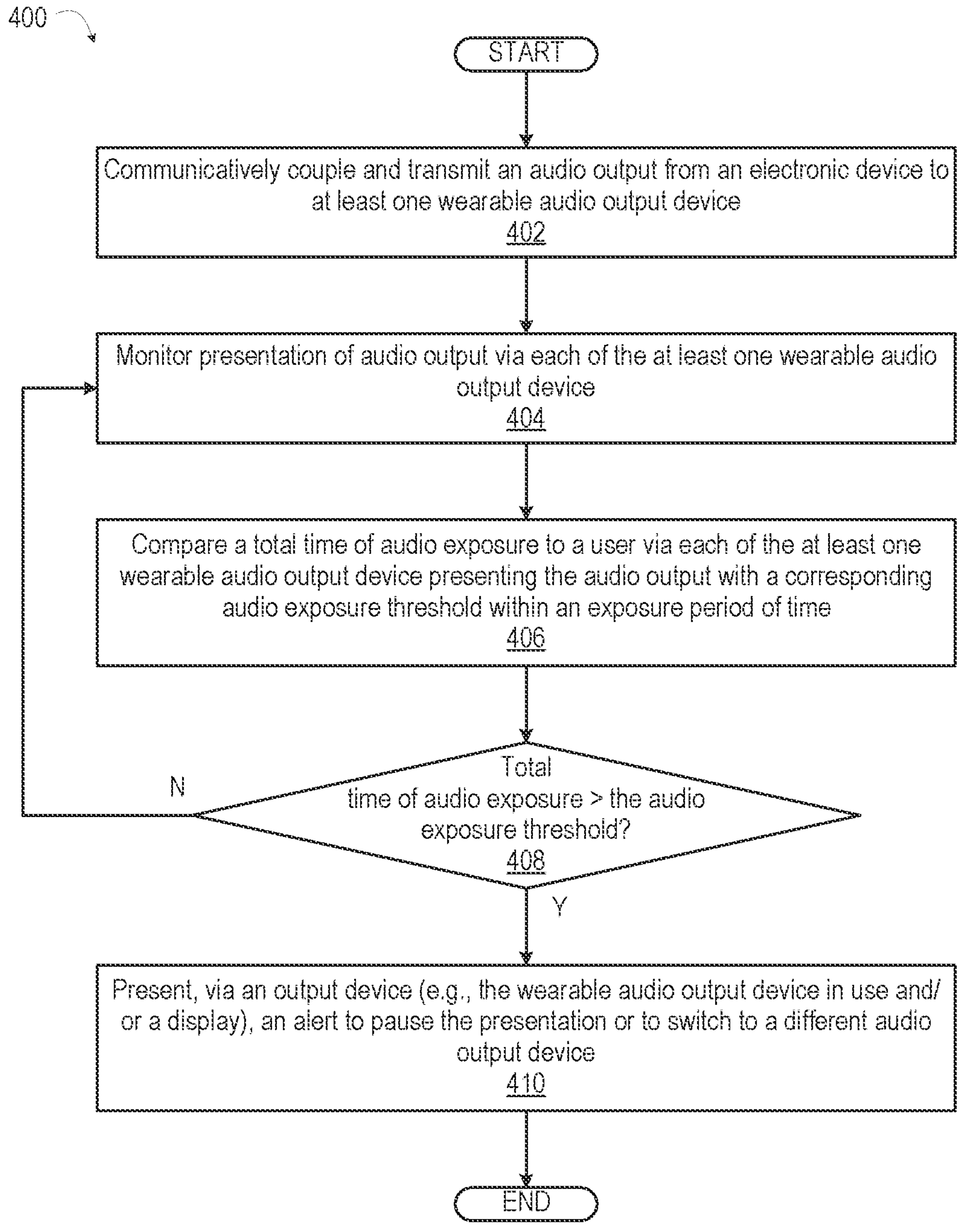
FIG. 4 is a flow diagram presenting an example method of employing digital wellbeing policies responsive to the accumulated usage of a wearable audio output device, according to one or more embodiments.
Figure 5:
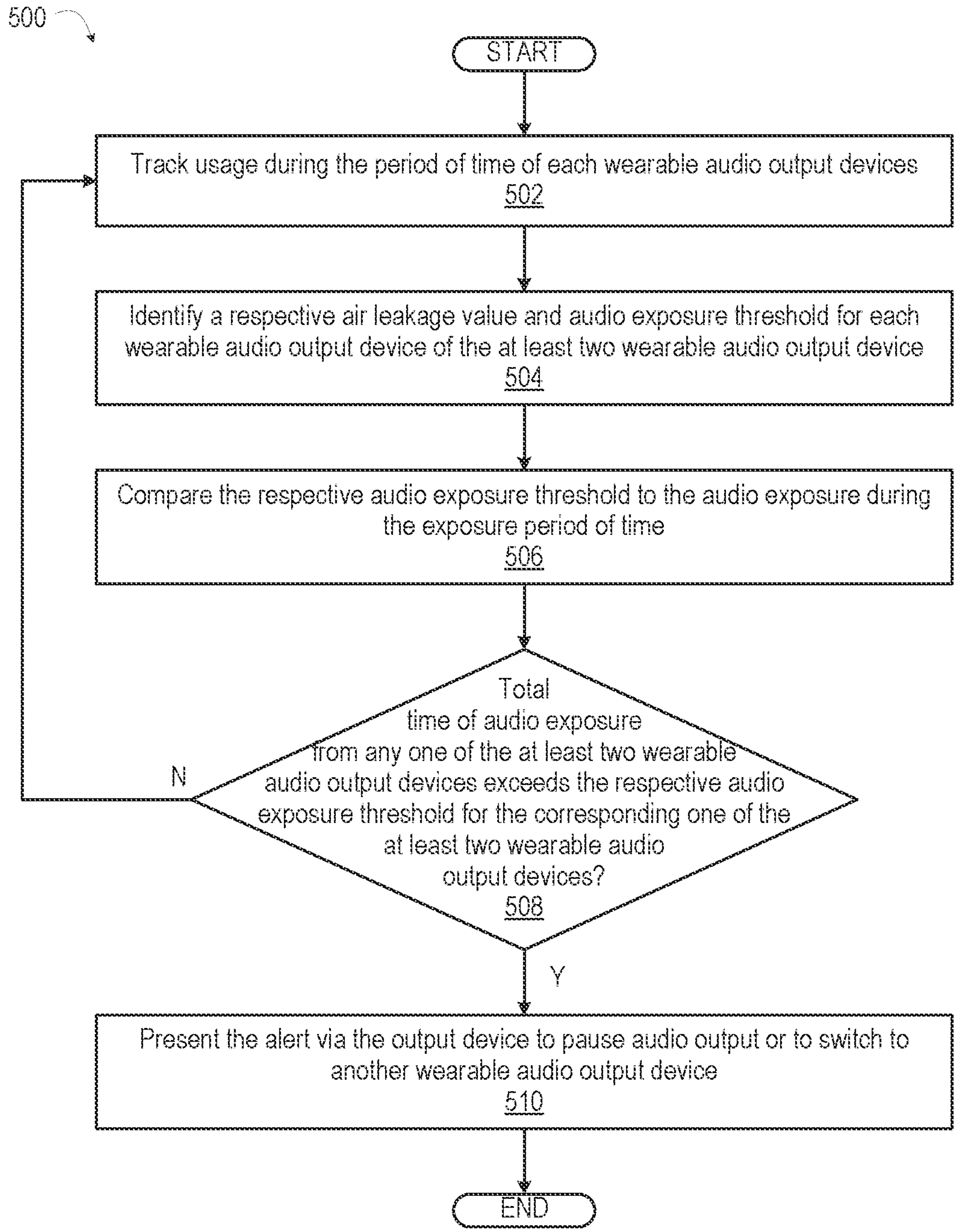
FIG. 5 is a flow diagram of a method of presenting a notification to switch wearable audio output device in response to exceeding a duration threshold for one of more than one wearable audio output devices, according to one or more embodiments.
Figure 6:
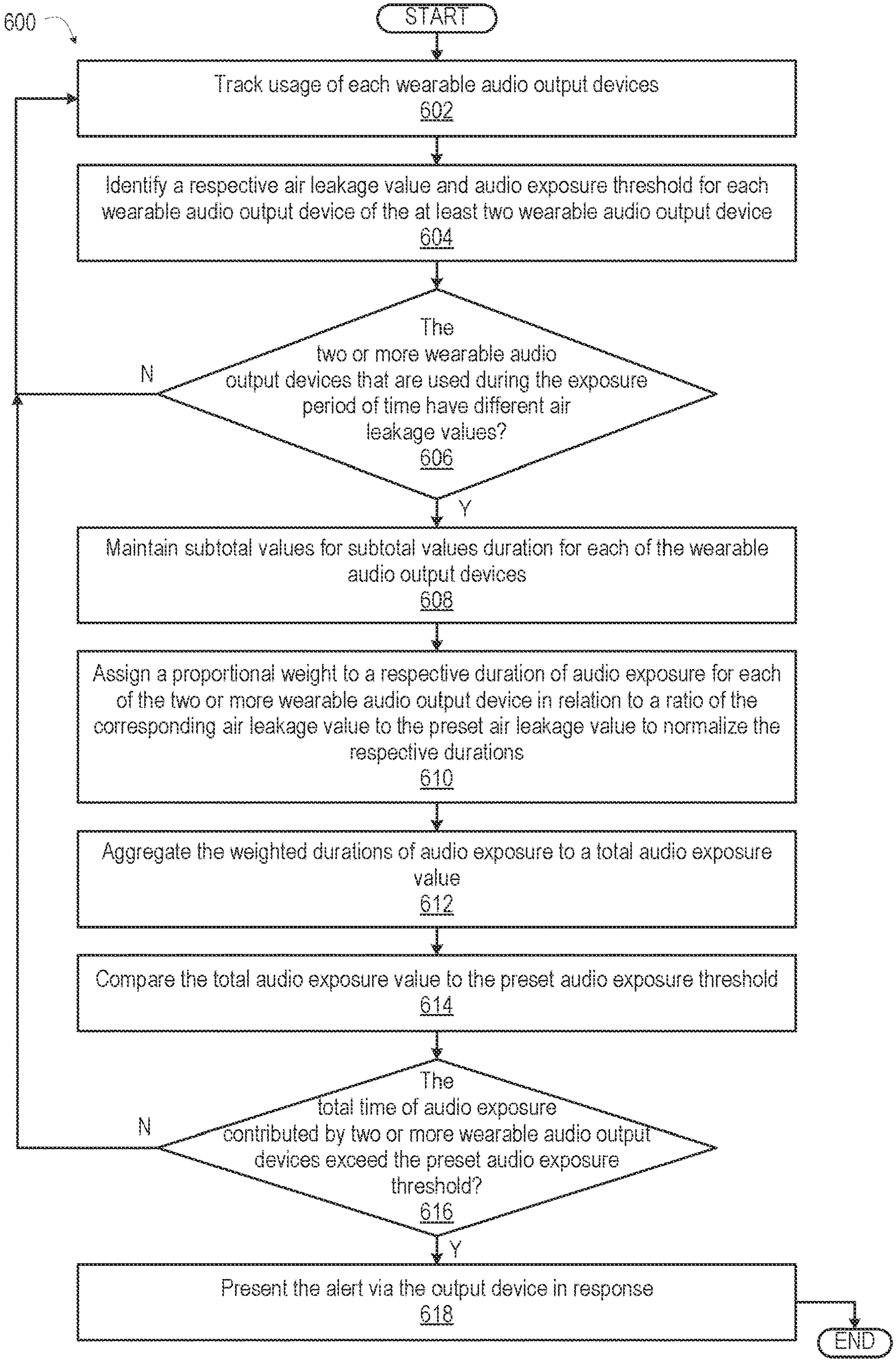
FIG. 6 is a flow diagram of a method of presenting a notification in response to exceeding a duration threshold for an aggregated and weighted total usage based on air leakage value of more than one wearable audio output device, according to one or more embodiments.
Figure 7:
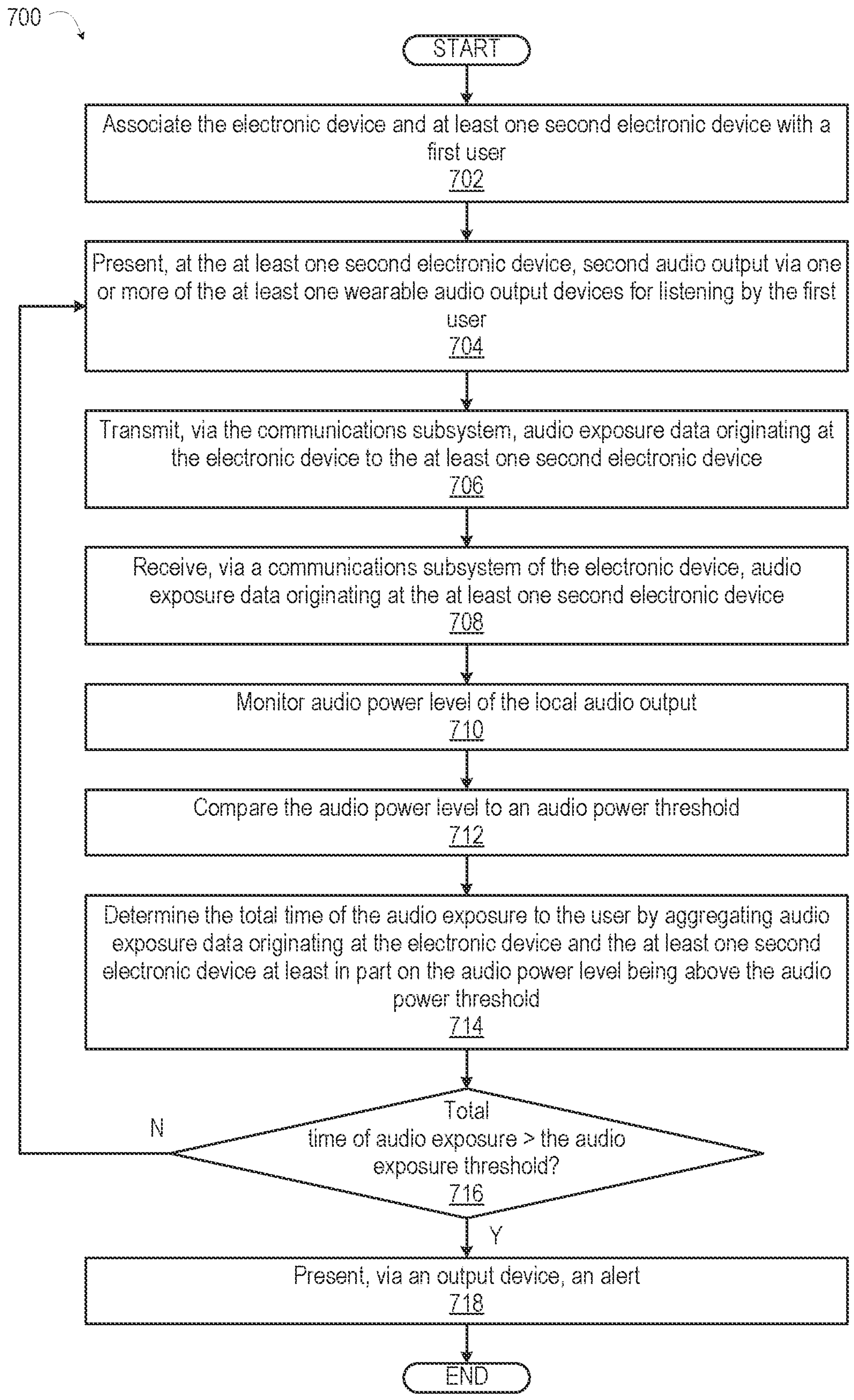
FIG. 7 is a flow diagram of a method of sharing usage tracking across multiple electronic devices, which are used sequentially to present audio output to the user, enabling notification based on cumulative usage duration across the multiple electronic devices exceeding a duration threshold.

FIG. 3 is a flow diagram presenting example method 300 of digital wellbeing management based on context of use of connected short-range wearable audio output device(s). FIG. 4 is a flow diagram presenting example method 400 of employing digital wellbeing policies responsive the accumulated usage of a wearable audio output device. FIG. 5 is a flow diagram of method 500 of presenting a notification to switch wearable audio output device in response to exceeding a usage duration threshold for one of more than one wearable audio output device. FIG. 6 is a flow diagram of method 600 of presenting a notification in response to exceeding a usage duration threshold for an aggregated and weighted total usage based on air leakage value of more than one wearable audio output device. FIG. 7 is a flow diagram of method 700 of sharing usage tracking across multiple electronic devices used sequentially to present audio output to the user, enabling notification based on cumulative duration across devices exceeding a usage duration threshold. The descriptions of method 300 (FIG. 3), method 400 (FIG. 4), method 500 (FIG. 5), method 600 (FIG. 6), and method 700 (FIG. 7) are provided with general reference to the specific components illustrated within the preceding FIGS. 1-2. Specific components referenced in method 300 (FIG. 3), method 400 (FIG. 4), method 500 (FIG. 5), method 600 (FIG. 6), and method 700 (FIG. 7) may be identical or similar to components of the same name used in describing preceding FIGS. 1-2. In one or more embodiments, controller 130 (FIG. 1) configures communication device 101 (FIG. 1) or a similar computing device to provide the described functionality of method 300 (FIG. 3), method 400 (FIG. 4), method 500 (FIG. 5), method 600 (FIG. 6), and method 700 (FIG. 7).

With reference to FIG. 3, method 300 includes monitoring audio driver of an electronic device (block 302). Method 300 includes determining whether audio is being played on a wearable device (decision block 304). Method 300 includes determining wearable device type (block 306). Method 300 includes identifying the user of the wearable audio output device (block 308). In an example, the electronic device authenticates a user for access to a user interface via one or more of face recognition, voice recognition, pass code entry (e.g., verbal, touch, or gesture input), and fingerprint/palm-print recognition. Method 300 includes obtaining total cumulative wearable audio device playback time (block 310). Method 300 includes continuously tracking and adding current audio wearable playback session time (block 312). Method 300 includes determining whether the cumulative audio wearable playback time is greater than a preset time limit (decision block 314). In response to determining that the cumulative audio wearable playback time is not greater (i.e., less than or equal to) than a preset time limit, method 300 returns to block 312. In response to determining that the cumulative audio wearable playback time is greater than a preset time limit, method 300 includes alerting the user to switch to a different device (e.g., speaker) or to stop playback (block 316). Then method 300 ends.

With reference to FIG. 4, method 400 includes communicatively coupling at least one wearable audio output device to an electronic device and transmitting an audio output from the electronic device to the at least one wearable audio output device (block 402). Method 400 includes monitoring presentation of audio output via each of the at least one wearable audio output device (block 404). Method 400 includes comparing a total time of audio exposure to a user via each of the at least one wearable audio output device presenting the audio output with a corresponding audio exposure threshold within an exposure period of time (block 406). Method 400 includes determining whether the total time of audio exposure exceeds the audio exposure threshold (decision block 408). In response to the total time of audio exposure not exceeding the audio exposure threshold (i.e., being less than or equal to), method 400 returns to block 404. In response to the total time of audio exposure exceeding the audio exposure threshold, method 400 includes presenting, via an output device (e.g., the wearable audio output device in use and/or a display), an alert to pause the presentation or to switch to a different audio output device (block 410). Then method 400 ends.

With reference to FIG. 5, method 500 includes tracking subtotal values of usage during the period of time of each of at least two wearable audio output devices (block 502). Method 500 includes identifying a respective air leakage value and audio exposure threshold for each wearable audio output device of at least two wearable audio output devices (block 504). Method 500 includes comparing the respective audio exposure threshold to the subtotal values during the exposure period of time (block 506). Method 500 includes determining whether the total time of audio exposure from any one of the at least two wearable audio output devices exceeds the respective audio exposure threshold for the corresponding one of the at least two wearable audio output devices (decision block 508). In response to determining that the total time of audio exposure from any one of the at least two wearable audio output devices does not exceed (i.e., is less than or equal to) the respective audio exposure threshold for the corresponding one of the at least two wearable audio output devices, method 500 returns to block 502. In response to determining that the total time of audio exposure from any one of the at least two wearable audio output devices exceeds the respective audio exposure threshold for the corresponding one of the at least two wearable audio output devices, method 500 includes presenting an alert via the output device to pause audio output for that particular wearable audio output device or to switch to another one of the at least two wearable audio output devices (block 510). Then method 500 ends.

With reference to FIG. 6, method 600 includes tracking usage of each of two or more wearable audio output devices (block 602). Method 600 includes identifying the respective air leakage value and audio exposure threshold for each wearable audio output device (block 604). Method 600 includes determining whether two or more wearable audio output devices that are used during the exposure period of time have different air leakage values (block 606). In response to determining that the two or more wearable audio output devices do not have different air leakage values, method 600 returns to block 602. In response to determining that the two or more wearable audio output devices have different air leakage values, method 600 includes maintaining subtotal values for audio exposure duration for each of the two or more wearable audio output devices (block 608). Method 600 includes assigning a proportional weight to a respective duration of audio exposure for each of the two or more wearable audio output device in relation to a ratio of the corresponding air leakage value to a preset air leakage value to normalize the respective durations (block 610). As described above regarding FIG. 1, weighting the durations is performed in relation to the respective audio exposure threshold scales the data to allow combining. Method 600 includes aggregating the weighted durations of audio exposure to a total audio exposure value (block 612). Method 600 includes comparing the total audio exposure value to a preset audio exposure threshold (block 614). Method 600 includes determining whether the total time of audio exposure contributed by the two or more wearable audio output devices exceeds the preset audio exposure threshold (decision block 616). In response to determining that the total time of audio exposure contributed by the two or more wearable audio output devices does not exceed the preset audio exposure threshold, method 600 returns to block 602. In response to determining that the total time of audio exposure contributed by the two or more wearable audio output devices exceeds the preset audio exposure threshold, method 600 includes presenting an alert via the output device (block 618). Then method 600 ends.

With reference to FIG. 7, method 700 includes associating the electronic device and at least one second electronic device with a first user (block 702). Method 700 includes presenting, at the at least one second electronic device, second audio output via one or more of the at least one wearable audio output devices for listening by the first user (block 704). Method 700 includes transmitting, via the communications subsystem, audio exposure data for audio exposure originating at the electronic device to the at least one second electronic device (block 706). The audio exposure data enables the at least one second electronic device to similarly perform digital wellbeing monitoring and alerts while being operated by the user. In particular, the at least one second electronic device may aggregate audio exposure data originating at the electronic device and at the at least one second electronic device and generate a subsequent alert in response to a second total time of audio exposure exceeding the audio exposure threshold. Method 700 includes receiving, via a communications subsystem of the electronic device, audio exposure data originating at the at least one second electronic device (block 708). Method 700 includes monitoring audio power level of the local audio output (block 710). Method 700 includes comparing the audio power level to an audio power threshold (block 712). Method 700 includes determining the total time of the audio exposure to the user by aggregating audio exposure data originating at the electronic device and the at least one second electronic device at least in part on the audio power level being above the audio power threshold (block 714). Method 700 includes determining whether the total time of audio exposure exceeds the audio exposure threshold (decision block 716). In response to the total time of audio exposure not exceeding the audio exposure threshold (i.e., being less than or equal to), method 700 returns to block 704. In response to the total time of audio exposure exceeding the audio exposure threshold, method 700 includes presenting, via an output device, an alert (block 718). Then method 700 ends.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

an audio driver configured to communicatively couple and transmit audio output to at least one wearable audio output device; and a controller communicatively coupled to the audio driver, and which:

monitors presentation of audio output via each of the at least one wearable audio output device to obtain a total time of exposure of a user to presentation of the audio output via each of the at least one wearable audio output device, wherein, in response to the at least one wearable audio output device comprising at least two wearable audio output devices, the controller:

maintains subtotal values for audio exposure duration for each of the at least two wearable audio output devices;

compares a respective audio exposure threshold to the subtotal values during an exposure period of time; and presents a notification via the output device to pause audio output in response to the total time of audio exposure from any one of the at least two wearable audio output devices exceeding the respective audio exposure threshold for a corresponding one of the at least two wearable audio output devices;

compares the total time of audio exposure to an audio exposure threshold; and presents an alert via an output device in response to the total time of audio exposure exceeding the audio exposure threshold.

2. The electronic device of claim 1, further comprising:

a communications subsystem by which the electronic device communicates with at least one second electronic device that also presents audio output via one or more of the at least one wearable audio output device;

wherein the controller:

associates the electronic device and at least one second electronic device with a first user, the at least one second electronic device presenting second audio output via the one or more of the at least one wearable audio output devices for listening by the first user;

receives, via the communications subsystem from the at least one second electronic device, audio exposure data originating at the at least one second electronic device; and determines the total time of the audio exposure to the user by aggregating audio exposure data from audio originating at the electronic device and audio originating at the at least one second electronic device.

3. The electronic device of claim 2, wherein the controller transmits, via the communications subsystem, audio exposure data originating at the electronic device to the at least one second electronic device to enable the at least one second electronic device to aggregate audio exposure originating at the electronic device and audio exposure originating at the at least one second electronic device and to generate a subsequent alert in response to a second aggregate total time of audio exposure exceeding the audio exposure threshold.

4. The electronic device of claim 1, wherein the controller:

monitors audio power level of the audio output;

compares the audio power level to an audio power threshold; and aggregates the audio exposure total based at least in part on the audio power level being above the audio power threshold.

5. The electronic device of claim 1, wherein:
in response to the at least one wearable audio output device comprising at least two wearable audio output devices, the controller:
compares each respective audio exposure threshold to the audio exposure from a corresponding wearable audio output device during an exposure period of time; and
presents the alert via the output device to switch to another wearable audio output device in response to the total time of audio exposure from a corresponding wearable audio output device exceeding the respective audio exposure threshold for a corresponding one of the at least two wearable audio output devices.

6. The electronic device of claim 1, further comprising a memory containing a preset air leakage value associated with a preset audio exposure threshold, wherein:
the at least one wearable audio output device comprises at least two wearable audio output devices; and
the controller:
in response to determining that two or more wearable audio output devices having different air leakage values are used during an exposure period of time:
identifies a respective air leakage value and audio exposure threshold for each wearable audio output device of the at least two wearable audio output devices;
maintains the subtotal values for audio exposure duration for each of the wearable audio output devices;
assigns a proportional weight to a respective duration of audio exposure for each of the two or more wearable audio output devices in relation to a ratio of the corresponding air leakage value to the preset air leakage value to normalize the respective durations;
aggregates the weighted durations of audio exposure to a total audio exposure value;
compares the total audio exposure value to the preset audio exposure threshold; and
presents the alert via the output device in response to the total time of audio exposure contributed by the two or more wearable audio output devices exceeding the preset audio exposure threshold.

7. The electronic device of claim 1, wherein:
the output device comprises at least one of the wearable audio output device and a display;
the electronic device further comprises an input device communicatively coupled to the controller; and
the controller:
presents, as the alert, output comprising a prompt to pause the audio output; and
pauses the presentation of the audio output on a current one of the at least one audio output device, in response to receiving a corresponding input via the input device.

8. A method comprising:
communicatively coupling and transmitting an audio output from an electronic device to at least one wearable audio output device;
monitoring presentation of audio output via each of the at least one wearable audio output device to obtain a total time of exposure of a user to presentation of the audio output via each of the at least one wearable audio output device, wherein, in response to the at least one wearable audio output device comprising at least two wearable audio output devices, the method further comprises:
maintaining subtotal values for audio exposure duration for each of the at least two wearable audio output devices;
comparing a respective audio exposure threshold to the subtotal values during an exposure period of time; and
presenting a notification via the output device to pause audio output in response to the total time of audio exposure from any one of the at least two wearable audio output devices exceeding the respective audio exposure threshold for a corresponding one of the at least two wearable audio output devices;
comparing the total time of audio exposure to an audio exposure threshold; and
presenting an alert via an output device in response to the total time of audio exposure exceeding the audio exposure threshold.

9. The method of claim 8, further comprising:
associating the electronic device and at least one second electronic device with a first user;
presenting, at the at least one second electronic device, second audio output via one or more of the at least one wearable audio output devices for listening by the first user;
receiving, via a communications subsystem of the electronic device, audio exposure data originating at the at least one second electronic device; and
determining the total time of the audio exposure to the user by aggregating audio exposure data from audio originating at the electronic device and audio originating at the at least one second electronic device.

10. The method of claim 9, further comprising transmitting, via the communications subsystem, audio exposure data originating at the electronic device to the at least one second electronic device to enable the at least one second electronic device to aggregate audio exposure data originating at the electronic device and audio exposure originating at the at least one second electronic device and to generate a subsequent alert in response to a second aggregate total time of audio exposure exceeding the audio exposure threshold.

11. The method of claim 8, further comprising:
monitoring audio power level of the audio output;
comparing the audio power level to an audio power threshold; and
aggregating the audio exposure total based at least in part on the audio power level being above the audio power threshold.

12. The method of claim 8, wherein:
in response to the at least one wearable audio output device comprising at least two wearable audio output devices, the method further comprises:
comparing each corresponding audio exposure threshold to the audio exposure from a corresponding wearable audio output device during an exposure period of time; and
presenting the alert via the output device to switch to another wearable audio output device in response to the total time of audio exposure from a corresponding wearable audio output device exceeding the respective audio exposure threshold for any one of the at least two wearable audio output devices.

13. The method of claim 8, wherein:

in response to the at least one wearable audio output device comprising at least two wearable audio output devices, the method further comprises:

in response to determining that two or more wearable audio output devices having different air leakage values are used during an exposure period of time:

identifying a respective air leakage value and audio exposure threshold for each wearable audio output device of the at least two wearable audio output devices;

accessing a preset air leakage value associated with a preset audio exposure threshold;

assigning a proportional weight to a respective duration of audio exposure for each of the two or more wearable audio output devices in relation to a ratio of a corresponding air leakage value to the preset air leakage value to normalize the respective durations;

aggregating the weighted durations of audio exposure to a total audio exposure value;

comparing the total audio exposure value to the preset audio exposure threshold; and presenting the alert via the output device in response to the total time of audio exposure contributed by two or more wearable audio output devices exceeding the preset audio exposure threshold.

14. The method of claim 8, wherein:

the output device comprises at least one of the wearable audio output device and a display; and the method further comprises:

presenting, as the alert, output comprising a prompt to pause the audio output; and pausing the presentation of the audio output on a current one of the at least one audio output device, in response to receiving a corresponding input by the input device.

15. A computer program product comprising:

a non-transitory computer readable storage device; and program code stored on the computer readable storage device that when executed by a processor associated with an electronic device, the program code enables the electronic device to provide functionality of:

communicatively coupling and transmitting an audio output from the electronic device to at least one wearable audio output device, wherein in response to the at least one wearable audio output device comprising at least two wearable audio output devices, the electronic device provides the functionality of:

maintaining subtotal values for audio exposure duration for each of the at least two wearable audio output devices;

comparing a respective audio exposure threshold to the subtotal values during an exposure period of time; and presenting a notification via the output device to pause audio output in response to the total time of audio exposure from any one of the at least two wearable audio output devices exceeding the respective audio exposure threshold for a corresponding one of the at least two wearable audio output devices;

monitoring presentation of audio output via each of the at least one wearable audio output device to obtain a total time of exposure of a user to presentation of the audio output via each of the at least one wearable audio output device;

comparing the total time of audio exposure to an audio exposure threshold; and presenting an alert via an output device in response to the total time of audio exposure exceeding the audio exposure threshold.

16. The computer program product of claim 15, wherein the program code enables the electronic device to provide functionality of:

associating the electronic device and at least one second electronic device with a first user;

presenting, at the at least one second electronic device, second audio output via one or more of the at least one wearable audio output devices for listening by the first user;

receiving, via a communications subsystem of the electronic device, audio exposure data originating at the at least one second electronic device; and determining the total time of the audio exposure to the user by aggregating audio exposure data from audio originating at the electronic device and audio originating at the at least one second electronic device.

17. The computer program product of claim 16, wherein the program code enables the electronic device to provide functionality of transmitting, via the communications subsystem, audio exposure data originating at the electronic device to the at least one second electronic device to enable the at least one second electronic device to aggregate audio exposure data originating at the electronic device and audio exposure originating at the at least one second electronic device and to generate a subsequent alert in response to a second aggregate total time of audio exposure exceeding the audio exposure threshold.

18. The computer program product of claim 15, wherein the program code enables the electronic device to provide functionality of:

monitoring audio power level of the audio output;

comparing the audio power level to an audio power threshold; and aggregating the audio exposure total based at least in part on the audio power level being above the audio power threshold.

* * * * *